Nov. 30, 1965 B. A. WAMBSGANSS 3,221,275
VARIABLE DIRECTIONAL COUPLER UTILIZING SPECIALLY SHAPED
COUPLING APERTURE, USED AS NON-DISSIPATIVE
MICROWAVE ATTENUATOR
Filed April 3, 1964 4 Sheets-Sheet 1

INVENTOR.
BERNARD A. WAMBSGANSS
BY
ATTORNEY

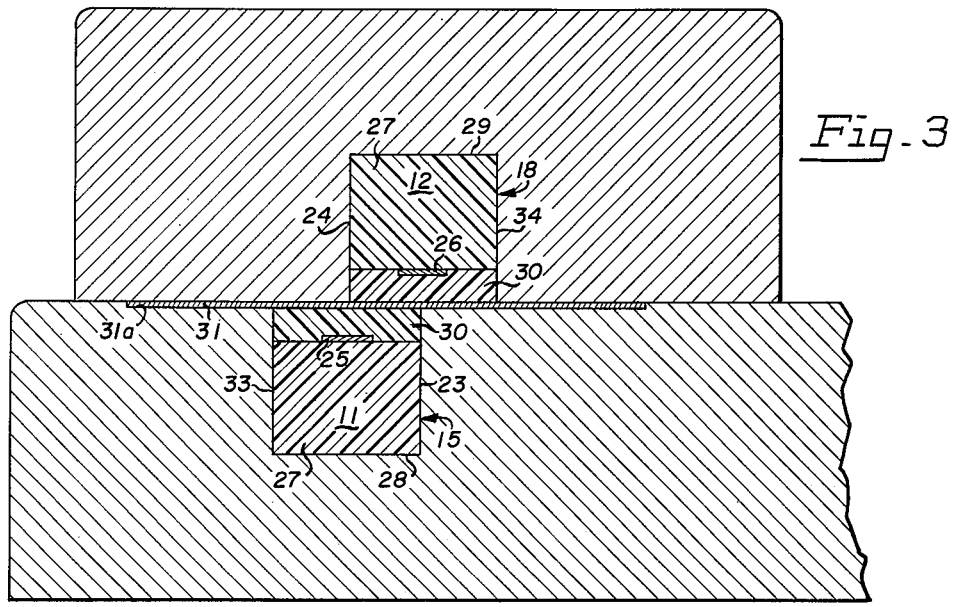
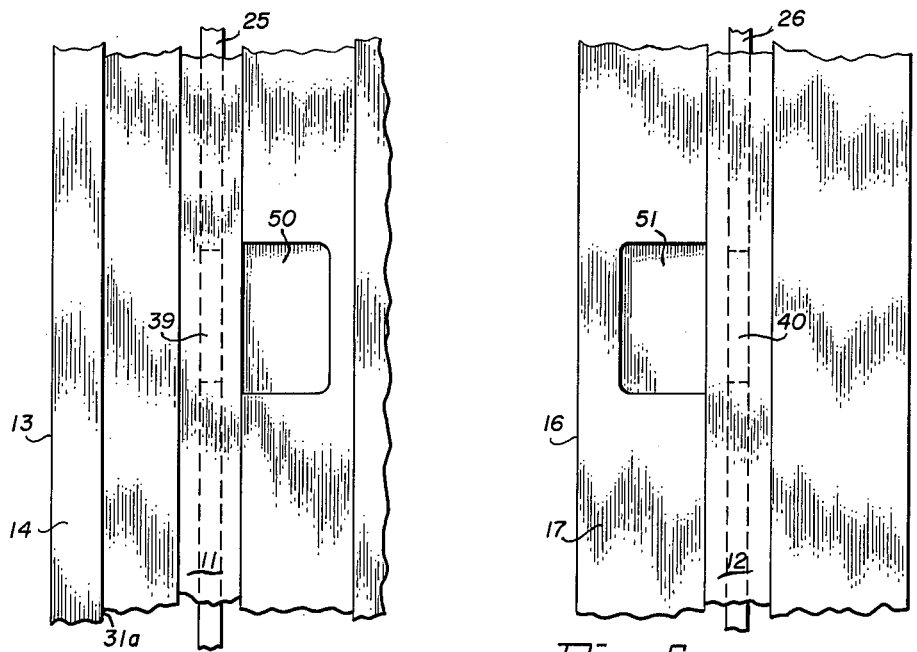

INVENTOR.
BERNARD A. WAMBSGANSS
BY
ATTORNEY

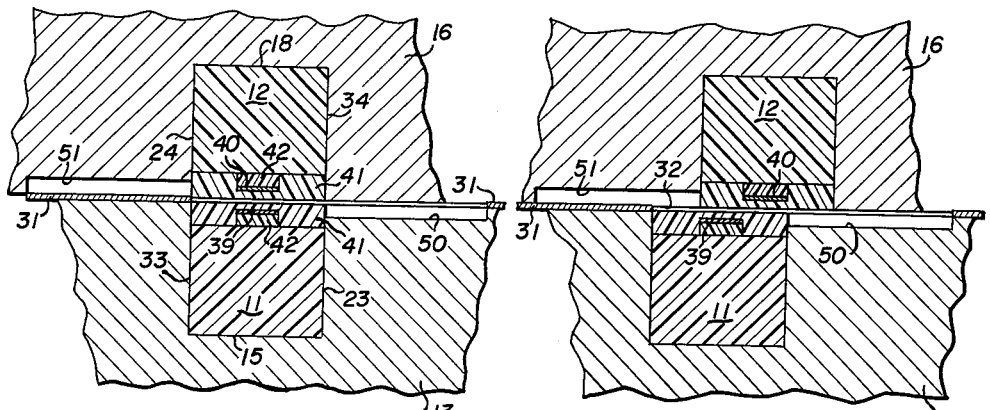
*Fig_7a*  *Fig_7b*
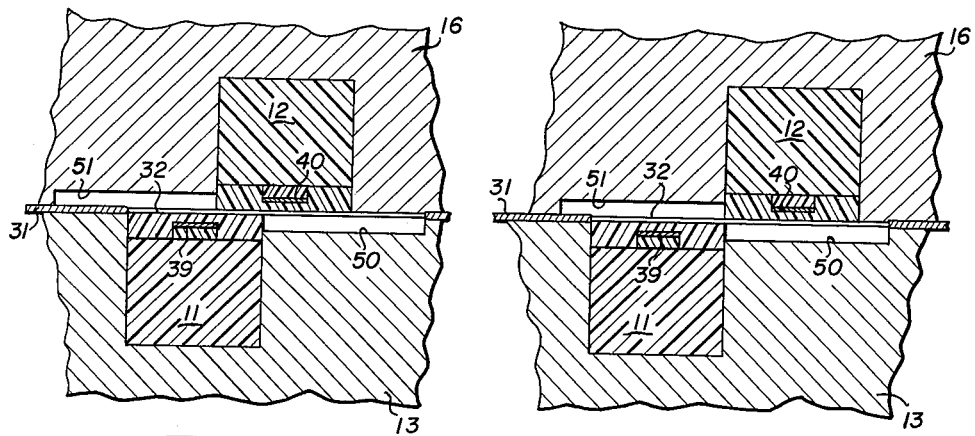
*Fig_7c*  *Fig_7d*
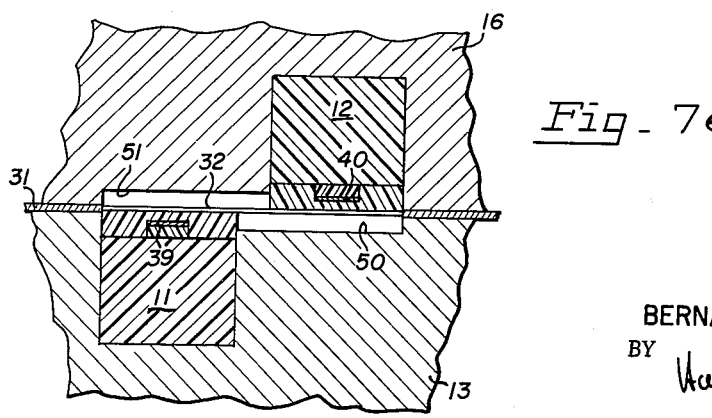
*Fig_7e*
INVENTOR.
BERNARD A. WAMBSGANSS
BY Harvey J. Lambert
ATTORNEY United States Patent Office 3,221,275
Patented Nov. 30, 1965

3,221,275
VARIABLE DIRECTIONAL COUPLER UTILIZING SPECIALLY SHAPED COUPLING APERTURE, USED AS NON-DISSIPATIVE MICROWAVE ATTENUATOR
Bernard A. Wambsganss, Los Altos, Calif., assignor to Alfred Electronics, Palo Alto, Calif., a corporation of California
Filed Apr. 3, 1964, Ser. No. 357,064
11 Claims. (Cl. 333—10)

This invention relates to microwave translating devices and more particularly to a device for directionally coupling a selected and continuously variable portion of the wave energy propagated in a first translation path to a second translation path.

This invention is an improvement over the microwave attenuator described in U.S. Letters Patent No. 3,121,848 entitled "Continuously Variable Microstrip Attenuator Using Directional Coupler" dated Feb. 18, 1964.

As is disclosed in the above referred to patent, it is frequently desirable to couple a selected amount of wave energy, which amount should be continuously variable from below 3 db to above 100 db, from a first wave energy translation path to a second translation path and to make the direction of propagation in the second path dependent on the direction of propagation in the first path. A device for performing such a function combines the properties of an adjustable attenuator and a directional coupler.

For example, when coupling a microwave signal generator, usually having a constant power output level or a power output level variable only between narrow limits, to utilization devices having different input power requirements or to a single utilization device having a continuously variable input power requirement, some attenuating device must be provided between the generator and the utilization device to vary the generator power applied to the utilization device. The unwanted portion of the generator power may then be dissipated in a matched dummy load.

For many applications it is desirable to utilize an attenuator capable of providing continuously variable attenuation over a large range of the generator output power so that utilization devices may be powered at any selected input power level.

Since any coupling between two transmission lines presents a discontinuity, it is easily understood that a variable coupling may give rise to a variable discontinuity. A variable discontinuity presents a variable impedance and therefore a variable voltage standing wave ratio. Since the flatness of the attenuator with frequency is related to the VSWR, it is of the utmost importance that the variable attenuator be constructed to maintain a constant line impedance which is independent of attenuator setting.

When utilizing a continuously variable, non-dissipative attenuator for coupling wave energy transmitted in one transmission path to another transmission path, the energy not coupled into the second path must be dissipated by some means to avoid reflection. Since the amount of wave energy to be dissipated varies with the wave energy coupled to the utilization device, the dissipating means must be efficient over a very large range of input power so that the reflections remain constant and at a minimum.

Since a certain amount of reflected wave energy can never be entirely avoided but only minimized, and since these reflections are often a function of the frequency, it is desirable that a continuously variable, non-dissipative attenuator be sensitive to the direction of propagation of wave energy in the first translation path so that the reflected wave does not pass into the second translation path and travel in the same direction as the attenuated wave energy coupled into the second path. One of the most efficient means of preventing the reflected wave energy to be added to the coupled energy is to utilize a directional coupler type of coupling between the first and the second translating path.

While the variable microwave attenuator described in U.S. Letters Patent 3,121,848 fulfills these requirements, it has been found that with increased attenuation the frequency response over a selected frequency band changes. More particularly it has been found that the midfrequency of the pass band increases with increase attenuation to some extent.

It is therefore a primary object of this invention to provide an improved means for coupling a selected portion of wave energy from a first to a second wave energy translation path which means is continuously variable as to the amount of energy coupled.

It is another object of this invention to provide a continuously variable attenuator for high frequency RF signals capable of attenuating over a range extending from below 3 db to above 100 db and having a frequency response substantially independent of attenuation.

It is a further object of this invention to provide a continuously variable attenuator for high frequency RF signals having a low insertion loss for maximum coupling, a low and substantially constant voltage standing wave ratio (VSWR), and a frequency response substantially constant over the attenuation band.

It is still a further object of this invention to provide an improved wave signal transmission system having two translation paths and including means for continuously varying the amount of wave energy coupled between the two translation paths. Further, the transmission system to be provided is to have a low and substantially frequency independent voltage standing wave ratio and insertion loss. The voltage standing wave ratio is also to be substantially independent of the degree of coupling between the two translation paths and therefore of the attenuation.

In accordance with a preferred embodiment of this invention, a continuously variable attenuator is provided by utilizing a pair of strip lines, mounted for lateral relative displacement with respect to one another. The strip lines have an open side disposed on opposite sides of a common ground plane having a coupling window whose average length is one-quarter of the midfrequency of the pass band and which increases in length with increase of relative displacement between the strip lines.

The ground plane coupling window or aperture is generally trapezoidal having a length which varies from below to above a one-quarter wavelength of the center of the operating frequency range, across its width. The portion of the strips in the strip line coextensive with the coupling window are spaced as close to one another as possible to provide good coupling when opposite channels are coextensive with one another.

Continuously variable attenuation is provided by laterally moving the strip lines across the ground plane. The degree of coupling is proportional to the width and separation of the coextensive portion of the two strip lines across the aperture and is minimized when the upper strip line is moved so that no coextensive portion remains and the separation is maximized.

Further, each strip line is provided with a lateral conductive extension which forms a ground plane for the opposite strip line as the lines are laterally displaced. Since the strip is very close to the open side of the strip line at the aperture, the ground plane extension is cavitated for proper impedance matching.

Other objects and a better understanding of the invention may be had by reference to the following description, taken in conjunction with the accompanying drawings, in which:

FIG. 3 is a sectional view taken along line 3—3 of FIG. 2;

FIG. 4 is an enlarged elevational view taken along line 4—4 of FIG. 1 looking down upon the lower waveguide translation path;

FIG. 5 is an enlarged elevational view taken along line 5—5 of FIG. 1 looking up at the upper waveguide translation path;

FIGS. 7a, 7b, 7c, 7d and 7e are enlarged sectional views, taken along line 7—7 of FIG. 2, showing five different positions of the continuously variable attenuator of this invention;

Figure 1:
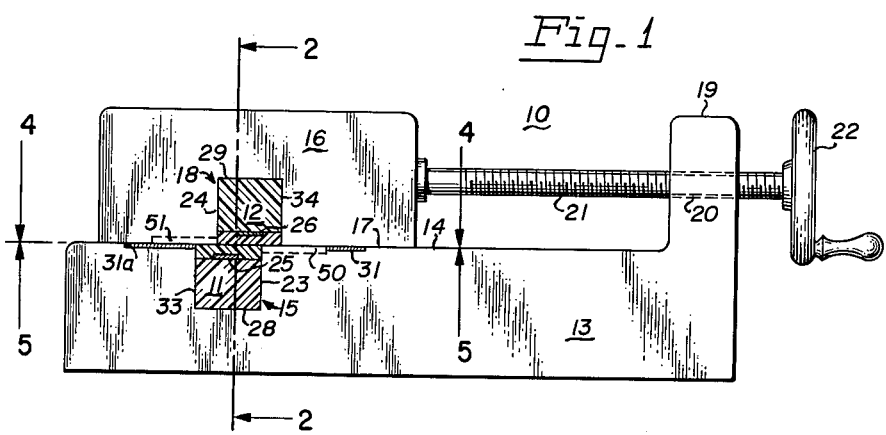
FIG. 1 is an elevational end view of the continuously variable attenuator of this invention.

Referring now to the drawings, in which like reference characters designate like parts, there is shown a continuously variable attenuator constructed in accordance with this invention and designated by reference character 10. As best seen in FIG. 1, attenuator 10 comprises a pair of wave energy transmission lines 11 and 12 which are mounted for lateral sliding motion with respect to one another. Transmission lines 11 and 12 are shown to be of the form generally known as strip lines or microstrips and are particularly useful in practicing the present invention because at least one of their outer walls is planar. It is to be understood, however, that the present invention may likewise be practiced with coaxial transmission lines in which the outer conductor is tubular, at least in part, and the inner conductor is circular, and with hollow waveguides as will be understood readily by those skilled in the art.

More specifically, attenuator 10 comprises a base plate 13 having a planar surface portion 14 into which a substantially rectangular channel 15 is cut to form the outer conductor of transmission line 11. Slidingly mounted upon upper surface 14 of base plate 13 is an upper plate 16 having a lower surface 17 into which a substantially rectangular channel 18 is cut, much like channel 15, to form the outer conductor of transmission line 12.

Base plate 13 is provided with a vertically extending bracket 19 having a threaded opening or passage 20. A threaded lead screw or spindle 21 having a hand wheel 22 mounted thereto, engages threaded opening 20 and is rotatably mounted to upper plate 16 so that rotation of hand wheel 22 laterally displaces upper plate 16 with respect to base plate 13. It is to be understood that bracket 19 and spindle 21 are merely illustrative of a lateral moving means and have been selected for simplicity in showing the operation of this invention. In practice, it will be found more convenient to utilize guides and worm gears so that accurately controlled and true lateral motion is provided. The limits of lateral displacement between transmission lines 11 and 12 will be explained in more detail hereinafter, and should include a first position in which transmission lines 11 and 12 are exactly opposite to one another for maximum coupling and a second position in which transmission lines 11 and 12 are laterally displaced with respect to one another a maximum amount which exceeds a transmission line width for minimum coupling.

Figure 2:
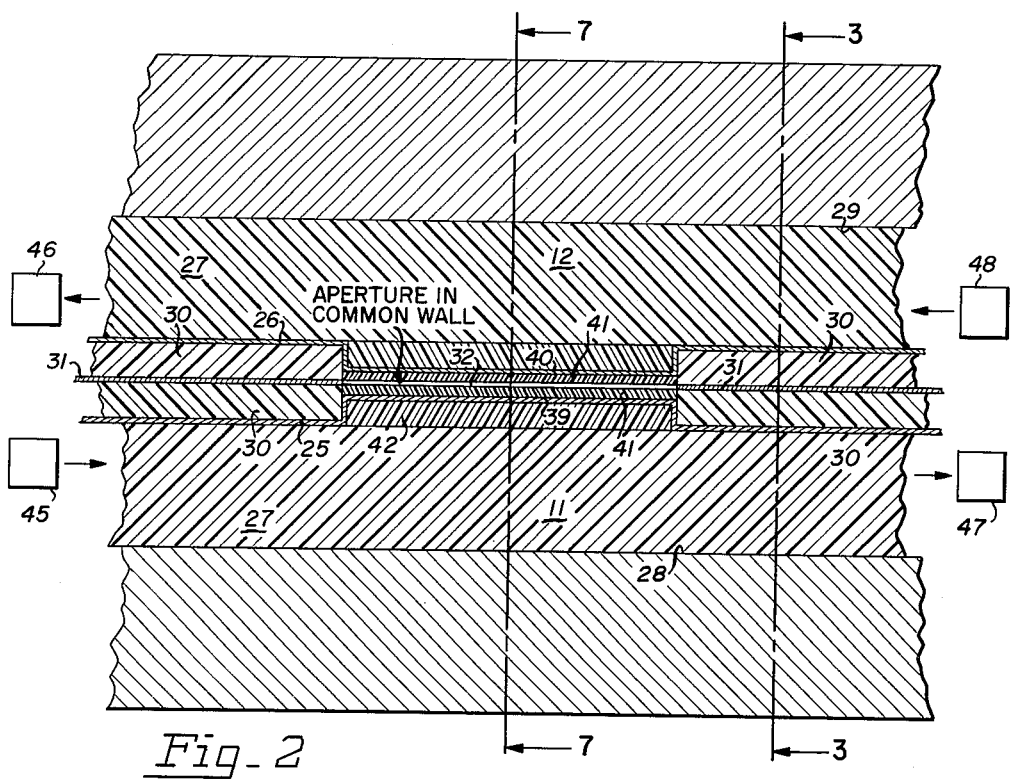
FIG. 2 is an enlarged sectional view taken along lines 2—2 of FIG. 1.

The inner conductors of transmission lines 11 and 12 are in the form of strips 25 and 26, asymmetrically located respectively in channels 15 and 18. The means utilized for asymmetrically supporting strips 25 and 26 inside channels 15 and 18 will now be explained. Each channel, as best seen in FIGS. 2 and 3, includes a substantially rectangular elongated insert 27 of low-loss dielectric material such as Teflon which completely fills the respective channel to a selected height, the selected height being the desired distance between strip 25 and bottom wall 28 of transmission line 11, and strip 26 and top wall 29 of transmission line 12. Strips 25 and 26 are placed on the respective upper and lower surfaces of insert 27. The remaining space of channels 15 and 18 is then filled with inserts 30 which are provided with a shallow accommodation channel dimensioned to clear strips 25 and 26.

Chanels 15 and 18 and strips 25 and 26 are respectively dimensioned and spaced to provide transmission lines having a selected input impedance. For example, in order to provide a transmission line having an impedance of approximately 50 ohms, the dimensions are as follows: the width of each channel is .275 inch, the depth of each channel is .250 inch, the width of each strip is .120 inch, and the thickness of each strip is .003 inch. The strip is positioned in such a manner that its distance of separation from the bottom of the channel is .200 inch (in case of strip 25 and wall 28) and symmetric with respect to the side walls.

Transmission lines 11 and 12 so far described are three sided strip lines (enclosed on three sides) open along one side and are disposed so that the open side of one faces the open side of the other. To provide the fourth wall, a thin metallic foil member or ground plane 31 is sandwiched between surface 14 of base plate 13 and surface 17 of upper plate 16. Foil member 31, which forms a common waveguide wall, becomes the top wall of transmission line 11 and the bottom wall of transmission line 12 and is selected to be of very thin material so that the distance of separation between transmission lines 11 and 12 is kept at a minimum. Common wall 31 is immovably affixed either to base plate 13 so that upper plate 16 slides thereover (as shown) or may be affixed to upper plate 16 so that it, together with upper plate 16, may slide over base plate 13. For purposes of illustration, member 31 is shown as lying in a channel 31a in plate 13.

Figure 6:
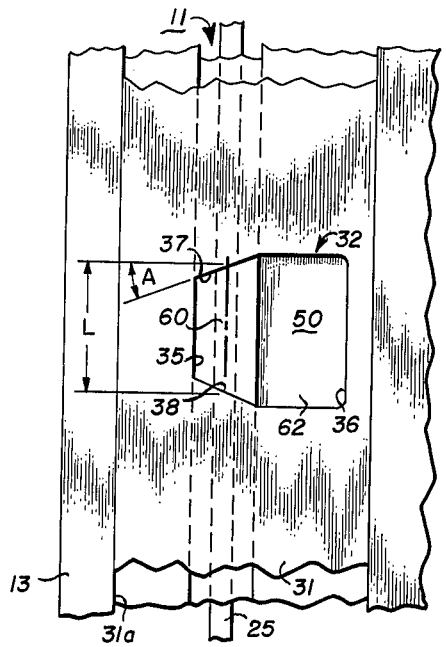
FIG. 6 is an elevational view, just as FIG. 4, with the conductive ground plane placed upon the lower waveguide translation path.

Ground plane 31, best seen in FIG. 6, is provided with an aperture 32 through which transmission lines 11 and 12 can communicate with one another. Aperture 32 has a trapezoidal portion 60 which overlies transmission line 11 and a rectangular portion 62 depending sideways from the long dimension of portion 60 to provide an opening coextensive with transmission line 12 when the latter is displaced to its second position for maximum attenuation.

Trapezoidal portion 60 of aperture 32 has a center length equal to one-quarter of the center operating frequency as indicated by dimension L in FIG. 6. The opposite end walls 37 and 38 of portion 60 each make an angle A with a line perpendicular to the side walls which angle depends, to some degree, on the operating frequency. It has been found that in the band of frequencies between, say 1 and 20, gigacycles per second, an angle A of approximately 20 degrees provides a frequency response which is substantially independent with attenuation. The length of rectangular portion 62 is not critical as long as it is sufficiently long to fully expose the length of the underlying cavity as will be explained hereinafter.

Ground plane 31 is immovably affixed to upper surface 14 of base plate 13 so that aperture side wall 35 is lined up with the inner edge of side wall 33, and aperture side wall 36 is to the right of transmission line 11 as seen facing FIG. 1. When transmission lines 11 and 12 are laterally displaced to their second position, (maximum displacement) side wall 36 of aperture 32 is lined up with the inner edge of side wall 34 of transmission line 12. The portion of the transmission lines lying between the end walls of aperture 32 is also referred to as the apertured portion since it is the region in which transfer of wave energy takes place between transmission lines 11 and 12.

In the drawing, common wall 31 is shown much thicker than it actually is for reason of greater clarity, so that the drawing is not to scale.

As is best seen in FIG. 2, the portion of inner conductor strips 25 and 26, coextensive with aperture 32 and respectively designated by reference characters 39 and 40, are spaced much closer to one another than the portions of strips 25 and 26 outside aperture 32. In fact, the strip spacing in the apertured section is made as small as is compatible with proper strip support and proper impedance restoration to provide a minimum insertion loss at maximum coupling as explained hereinafter. To provide closer spacing, strip portion 39 is formed by providing a double bend in strip 25 at each end of strip portion 39 so that strip portion 39 is an upward displaced parallel continuation of strip 25. Strip portion 40 is similarly formed and comprises a downward displacement.

Means for properly and conveniently supporting strip portions 39 and 40 are best seen by reference to FIG. 2 and FIG. 7. Insert 27 continues straight through the apertured section and is not changed. However, a new closure insert 41 is provided which is similar to closure insert 30 except that it has a deeper channel for accommodating strip portions 39 and 40. A spacer member 42, also made of a low-loss dielectric, is utilized to fill the gap between the surfaces of insert 27 and the adjacent strip portions 39 and 40.

It has been found that raising and lowering strip portions 39 and 40 respectively by, say, .035 inch (for a total strip portion separation of .030 inch), results in sufficient close coupling making possible an insertion loss of less than 4 db. Closer spacing of the strip portion will further decrease the insertion loss (and increase the coupling) should this be found desirable.

It is to be noted that the lines can also be brought close together electrically for minimum insertion loss coupling without physically displacing the lines. This may be accomplished by inserting a dielectric having a much higher dielectric constant than the other support members in the apertured section in place of strip 41.

FIG. 2 further shows diagrammatically how attenuator device 10 of this invention may be connected between a wave energy source generator 45 and a utilization device 46. Generator 45 is connected to apply its output signal to the left side of transmission line 11 while utilization device 46 is connected to receive the coupled signal from the left side of transmission line 12. The portion of wave energy from generator 45 not coupled from transmission line 11 to transmission line 12 through the apertured portion continues to be propagated along transmission line 11 for absorption in a dummy load 47. Dummy loads such as 47 are well known termination devices which substantially absorb all waves received and which develop practically no reflections. However, since no dummy load is a perfect termination, a certain amount of reflections are generated. A portion of these reflections are coupled into transmission line 12 for propagation to the right. Consequently, a further dummy load 48 is connected to absorb these reflections so that utilization device 46 receives only wave energy coupled to transmission line 12 by energy flowing to the right in transmission line 11.

Referring now to FIGS. 4 and 5, there is shown, respectively, a top view of base plate 13 and a bottom view of upper plate 16. Each plate 13 and 16 is provided with a cavity 50 and 51, respectively, having a length equal to the long side wall of trapezoidal aperture portion 60 and having its end walls disposed symmetrically with respect to aperture 32. The width of cavity 50 and 51 is selected to be sufficiently great so that, when the transmission lines are displaced to their second position for minimum coupling, each transmission line sees a full width cavity. Cavity 50 in surface 14 is immediately adjacent to channel 15 and to the right thereof as viewed in FIG. 4. Similarly, cavity 51 in surface 17 is immediately adjacent to channel 18 and to the left thereof as best viewed in FIG. 5.

Accordingly, as transmission lines 11 and 12 are laterally displaced for maximum separation, the portion of each transmission line coextensive with aperture 32 faces a cavity which provides a remote ground plane in the apertured section. When the second position corresponds to a displacement of one channel width, the width is also equal to a channel width. For greater attenuation, a second position corresponding to a displacement greater than a channel width is selected so that the width of the cavity is likewise greater than a channel width.

The depth of cavities 50 and 51 is selected so that the line to ground plane distance restores the characteristic impedance of the apertured region of the transmission lines, (changed by displacing strips 25 and 26) to the characteristic impedance of the transmission lines outside the apertured region. In other words, the ground plane coextensive with strip portions 39 and 40 is positioned for a greater amount of separation from strip portions 39 and 40 to compensate for the close proximity of strip portions 39 and 40 to the surface of plates 13 and 16 and further to compensate for the fact that the cavity is filled with air and not with a low-loss solid dielectric material.

It has been found that for a 50 ohm characteristic impedance, with an attenuator dimensioned as described hereinbefore, substantial impedance restoration is obtained by providing a cavity having a depth substantially equal to .017 inch so that the distance betwen a strip portion and its cavitated ground plane becomes substantially equal to .032 inch. The amount of cavity depth may be calculated by taking into account that the space between the raised strip portion and the bottom of the cavity includes both a solid dielectric and air, or else may be empirically determined.

FIG. 6 shows lower plate 13 just as in FIG. 4 but with ground plane 31 placed thereon. As can be seen, trapezoidal portion 60 overlies strip line 11 and rectangular portion 62 overlies a cavitated ground plane 50 as has ben explained heretofore.

Referring now to FIGS. 7a, 7b, 7c, 7d and 7e, there are shown enlarged sectional views, taken along lines 7—7 of FIG. 2, of four different positions of lateral displacement of transmission lines 11 and 12. Each view is a section through the apertured regions of the transmission lines starting with the first position, then three intermediate positions and ending with the second position. FIG. 7a shows the position of maximum coupling in which transmission lines 11 and 12 are opposite and coextensive to one another across aperture 32. It has been found that by closely spacing strip portions 39 and 40 to one another, the insertion loss may be kept to below 3 db so that more than one-half of the energy from generator 45 may be coupled to utilization device 46.

FIG. 7b shows transmission lines 11 and 12 displaced by one-third of the channel width. It is immediately noticed that transmission line 11 sees not only two-thirds of transmission line 12 but also one-third of cavity 51 in upper plate 16. The same, of course, is true of transmission line 12 which sees one-third of cavity 50 in base plate 13. FIG. 7c shows transmission lines 11 and 12 displaced two-thirds of the channel width so that each transmission line sees one-third of the opposite transmission line and two-thirds of the cavity adjacent the opposite transmission line. Since strip portions 39 and 40 are substantially displaced from one another the degree of coupling in this position is already very small.

FIG. 7d shows transmission lines 11 and 12 displaced a full channel width so that each transmission line 11 substantially sees only a cavity through aperture 32. In this position the coupling between the transmission lines is very low. FIG. 7e shows transmission lines 11 and 12 displaced more than a channel width for greater attenuation which position corresponds to the second position and which is selected to correspond to a separation of minimum selected coupling.

Figure 8:
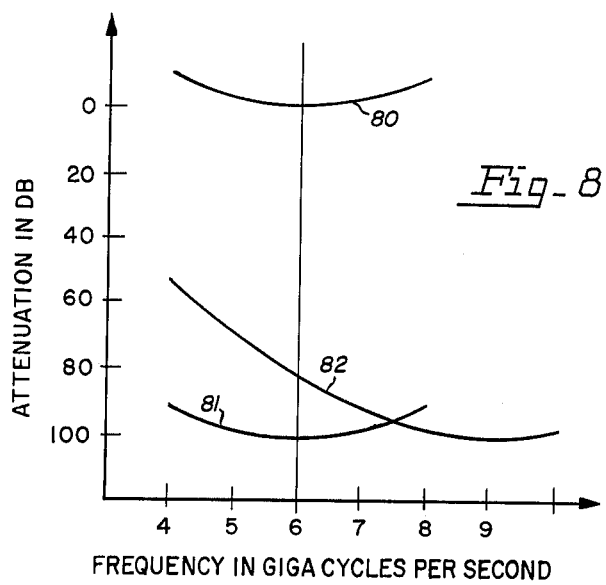
FIG. 8 is a graph showing the variation of frequency response with change of attenuation.

Referring to FIG. 8 there is shown a graph depicting the frequency response of the device of FIG. 1 at two different positions of the strip lines corresponding to two different values of attenuation. Curve 80 shows the frequency response of a frequency band extending from 4 to 8 gigacycles per second with aperture 32 being dimensioned so that distance L is equal to one-quarter wave length of the mid-frequency which is 6 gigacycles per second and with the strip lines positioned for maximum coupling.

Curve 81 shows the frequency response under the same conditions as that shown by curve 80 except that the strip lines are laterally displaced towards their second position for greater attenuation. As can be seen by comparing curves 80 and 81, the frequency response is substantially independent of the relative position of the two strip lines and therefore of the attenuation. There is also shown a curve 82 which depicts the frequency response obtained with an aperture 32 of rectangular configuration having a uniform length L, such as shown in U.S. Letters Patent 3,121,848 for the same lateral displacement as the one resulting in curve 81. A comparison of curves 81 and 82 immediately shows that for a uniformly rectangular aperture 32 the frequency response changes with the relative position of the two strip lines and therefore with the attenuation. In fact, curve 82 indicates that as attenuation increases, the center frequency increases which may be explained on the basis that with increase of lateral displacement, the aperture length as seen by the wave energy decreases. In other words, for an aperture having parallel end walls, increase in strip line displacement decreases the electrical length of the aperture, so that for curve 82 the electrical length corresponds to one-quarter of the wave length of the 8 gigacycle signal.

Figure 9A:
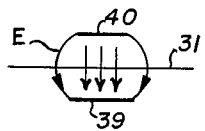
FIGS. 9a and 9b are illustrative diagrams useful in explaining the operation of the invention.
Figure 9B:
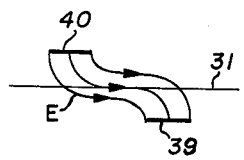

This phenomena can be explained with the aid of FIGS. 9a and 9b. As long as strips 39 and 40 are opposite to one another as shown in FIG. 9a, the electric field E is everywhere perpendicular to ground plane 31 so that the same has no electrical effect on the energy being transferred from one to the other strip line. However, if strips 39 and 40 are displaced with respect to one another as shown in FIG. 9b, the electric field E has a component parallel to ground plane 31 which, immediately adjacent to the end walls of aperture 32, interacts with the ground plane. The greater the separation, the longer is the parallel component and the more pronounced is the interaction. The interaction has the effect of electrically decreasing the length of the aperture as seen by the wave energy.

This edge effect, due to the component of the electric field parallel to the ground plane, is overcome by increasing the physical length of the aperture in the direction in which the movable strip line is displaced with respect to the stationary ground plane. As shown in FIG. 6 sloping end edges 37 and 38, making an angle of about 20° with respect to the direction of strip line displacement, have been found to increase the physical lengths of the aperture to overcome the decrease of electrical length due to the fringe or edge effect of the parallel electric field component.

There has been described hereinabove a continuously variable attenuator having properties of a directional coupler and being capable of providing attenuation from below 3 db to above 80 db between a pair of transmission lines. The frequency response of the attenuator is substantially independent of attenuation which is due, in part, to the utilization of sloped or inclined aperture end walls which increase the physical aperture length to compensate for the decreasing electrical aperture length due to lateral transmission line displacement.

What is claimed is:

1. A continuously variable attenuator comprising:
   a first wave energy transmission line portion;
   a second wave energy transmission line portion extending substantially parallel to said first transmission line portion, said first and said second transmission line portions being mounted for continuously variable relative lateral motion between a first position in which said transmission line portions are substantially opposite and facing to a second position in which said transmission line portions are substantially displaced; and
   aperture means between said first and second transmission line portions for coupling said transmission line portions to one another, the degree of coupling across said aperture means being proportional to the relative lateral displacement between said transmission line portions and being variable from a maximum at said first position to a minimum at said second position, said aperture means having a length which increases in the direction of displacement towards said second position.

2. A continuously variable attenuator in accordance with claim 1 in which said transmission line portions are strip lines having an outer conductor of substantially rectangular cross section and an inner conductor in the form of a thin strip.

3. A continuously variable attenuator in accordance with claim 2 in which said aperture means comprises a thin substantially planar foil member forming a common wall between said strip lines and including an aperture having a width which extends between the inwardly facing side walls of said first and second transmission line portions when in said second position.

4. A continuously variable attenuator in accordance with claim 3 in which said aperture, across its width, includes a trapezoidal portion overlying and coextensive with said first strip line and a rectangular portion depending sideways from the wide dimension of said trapezoidal portion.

5. A continuously variable attenuator in accordance with claim 4 in which the length of said trapezoidal portion, at the center, is substantially equal to one-quarter of the mean operating wavelength.

6. A continuously variable attenuator comprising:
   a first wave energy transmission line portion having an inner conductor;
   a second wave energy transmission line portion having an inner conductor extending substantially parallel to said first transmission line portion, said first and said second transmission line portions being mounted for continuously variable relative lateral motion between a first position in which said transmission line portions are substantially coextensive to a second position in which said transmission line portions are substantially displaced;
   aperture means between said first and second transmission line portions for coupling said transmission line portions to one another, the inner conductors coextensive with the length of said aperture means being in closer electrical proximity than outside the length of said aperture means, the degree of coupling across said aperture means being proportional to the relative lateral displacement between said transmission line portions and being variable from a maximum at said first position to a minimum of said second position, said length of said aperture means increasing in the direction of displacement from said first toward said second position; and
   impedance restoring means coextensive with said aperture means carried by each of said transmission line portions to maintain the impedance of said transmission line portions at a preselected value when said transmission line portions are laterally displaced from said first position, the impedance restoring means carried by said first transmission line portion cooperating with said second transmission line portion and the impedance restoring means carried by said second transmission line portion cooperating with said first transmission line portion, the length of said impedance restoring means being substantially equal to the longest dimension of said aperture means.

7. A continuously variable attenuator comprising:
a first wave energy strip transmission line open along one side;
a second wave energy strip transmission line open along one side;
a thin and substantially planar foil member, the open side of said first and second transmission lines being disposed parallel to one another and immediately adjacent on opposite sides of said foil member, said transmission lines being laterally movable between a first position in which said open sides are substantially coextensive and a second position in which said open sides have no coextensive portion, said foil member including an aperture for communicating said first and said second transmission lines, said aperture having a pair of opposite side walls separated approximately equal to the distance between opposite inward facing side walls of said transmission lines when in said second position and having a pair of opposite end walls which incline outwardly in opposite directions across one transmission line and continue substantially parallel across the remainder of the width of said aperture, the strip sections formed by the inner conductors of said strip transmission lines coextensive with the length of said aperture being spaced for maximum electrical coupling;
means between said transmission lines for continuously varying lateral displacement between said first and said second positions; and
impedance restoring means carried by each of said transmission line portions and extending substantially coextensive with the length of said aperture between parallel end walls and cooperating with the opposite transmission lines to compensate for the impedance mismatch caused by the increased electrical proximity of said strip section when said transmission lines are laterally displaced from said first position.

8. A continuously variable attenuator in accordance with claim 7 in which the distance between said sloping end walls at the center of the transmission line it overlies is one-quarter of the mean operating wavelength.

9. A continuously variable attenuator in accordance with claim 7 in which the angle subtended by said inclined end walls is between 20 and 60 degrees.

10. A continuously variable attenuator comprising:
a pair of wave energy transmission lines disposed for relative lateral displacement with respect to one another in a selected direction; and
common aperture means associated with said transmission lines by which wave energy is transferred from one transmission line to the other in accordance with their relative lateral position, said aperture means having an aperture which increases in length in said selected direction.

11. In a continuously variable attenuator in which a pair of transmission lines are mounted for relative lateral displacement with respect to one another and in which said transmission lines communicate with one another through an aperture fixed with respect to one of said transmission lines, the improvement of an aperture shaped to have outwardly sloping end walls in the direction of displacement of the other of said transmission line, the decree of inclination of each end wall being between 15 and 25 degrees from the lateral depending on the frequency of the operating wave energy, the length of said aperture across the center of the transmission line which it overlies being one-quarter of the mean length of the operating wave energy.

No references cited.

HERMAN KARL SAALBACH, *Primary Examiner.*